United States Patent [19]

Guillaume

[11] 4,241,993
[45] Dec. 30, 1980

[54] MOUNT FOR ORIGINALS IN PHOTOGRAPHIC DEVICES

[75] Inventor: Emile A. H. Guillaume, Ballaigues, Switzerland

[73] Assignee: Zelacolor Systems Establishment, Vaduz, Liechtenstein

[21] Appl. No.: 26,403

[22] Filed: Apr. 2, 1979

[30] Foreign Application Priority Data

Apr. 7, 1978 [CH] Switzerland ............... 3750/78

[51] Int. Cl.³ ............................................. G03B 27/62
[52] U.S. Cl. ..................................................... 355/75
[58] Field of Search .................................. 355/72–76

[56] References Cited

U.S. PATENT DOCUMENTS

| | | | |
|---|---|---|---|
| 1,946,810 | 2/1934 | Rowell | 355/75 |
| 1,973,827 | 9/1934 | Shwartz | 355/75 |
| 2,418,226 | 4/1947 | Haff | 355/75 |
| 2,507,161 | 5/1950 | Hughey | 355/76 |

FOREIGN PATENT DOCUMENTS 922868  4/1963  United Kingdom ............... 355/75

Primary Examiner—Donald A. Griffin
Attorney, Agent, or Firm—Ostrolenk, Faber, Gerb & Soffen

[57] ABSTRACT

The original mount which will be used in photographic devices for making reproduction, enlarged or screened images or separations, comprises two frames each being provided at their central portions with an exposure window, both windows being superimposed when both frames are superimposed, and arranged for clamping between their edges the transparent original. One of the frames is provided with means for removably fixing of the frame on a support of said photographic device. The fixing means allow a precise and rapid positioning of the frame and mount on the support by spring biassed fittings which fix and hold the mount by abutment in the three directions of the space.

11 Claims, 3 Drawing Figures

MOUNT FOR ORIGINALS IN PHOTOGRAPHIC DEVICES

BACKGROUND OF THE INVENTION

This invention relates to the field of photography. More particularly, it is related to a mount for transparent originals in such photographic devices wherein any photographic work is executed from a transparent original. Examples of such work is photographic imaging, reproduction, especially on optical benches, and production of colour separations and other selections, enlarged prints, screen technique prints, etc.

Original or negative mounts known until now usually comprise two glass plates fixed on a support; the transparent original or negative is retained between these parallel glass plates. Such original mounts have numerous disadvantages. For example, the glass plates must always thoroughly be cleaned before the introduction of an original since any speck would result in defective reproductions, screen prints, separations etc. which have been made from an original placed between dirty surfaces of glass plates. It must be noted that cleaning of glass plates usually creates electrostatic charges which tend to attract dust so that the cleaning results are always doubtful.

Furthermore, the fact that an original is placed between two glass plates does not permit the operator to replace the original exactly at the same location when the original had to be removed from between the plates, for example in order to execute corrections or retouches. Every time an original is removed from the original mount, the entire photographic installation must be completely readjusted.

Another disadvantage of conventional original mounts is the fact that image distortions or defects may occur due to the refraction and reflection of light on the plane-parallel glass plates. In addition thereto, it is known that glass is very difficult to be made without defects like inclusions, streaks, etc. which also cause image defects.

A further disadvantage of the original mounts of known glass plate type is the fact that all series work using more than one original, is impossible without intermediate adjustment even if each original has been prepared in its own particular mount or frame.

SUMMARY OF THE INVENTION

A first object of the invention is to obviate these disadvantages in providing a new and useful original mount allowing the direct exposure of the original without need of transparent support surfaces needing constantly repeated cleaning operations.

Another object of the invention is to provide an original mount of inexpensive and simple construction.

A further important object of this invention is to provide an original mount which can be rapidly and easily inserted into the photographic device with good precision, and which can be removed, for example to make a retouch, and then replaced on its support without any need of readjustment of the installation wherein it is used.

These and still other objects are implemented by the original mount of the invention which comprises two frames having each in their central portion an exposition window with corresponding apertures. The frames are adapted to press and retain between them the edge portions of a transparent original. One of the frames has fixing means for the removable attachment to a mount support being part of a photographic installation, the fixing means being arranged for a positioning of said frames relative to said support by pressing and fastening on abutments in three directions.

In a preferred embodiment of the invention, one of said frames has two positioning pins arranged to enter corresponding bores of the other frame, and spring means are provided between the two frames so that they are pressed together.

The removable fixing means of the original mount may comprise two pins of circular section, placed on the two opposite side walls of the frame, and entering in V-shaped slots of two corresponding supporting parts. Spring means are provided to bias, on one hand, said pins in one direction against the interior of the V slot, and, on the other hand, in a perpendicular direction in the axis of the pins. A magnet is placed perpendicular to the surface of one of the frames, working as a lateral abutment.

In the drawing, a preferred embodiment of the invention is represented.

DESCRIPTION OF THE PREFERRED EMBODIMENT

Figures 1, 2:
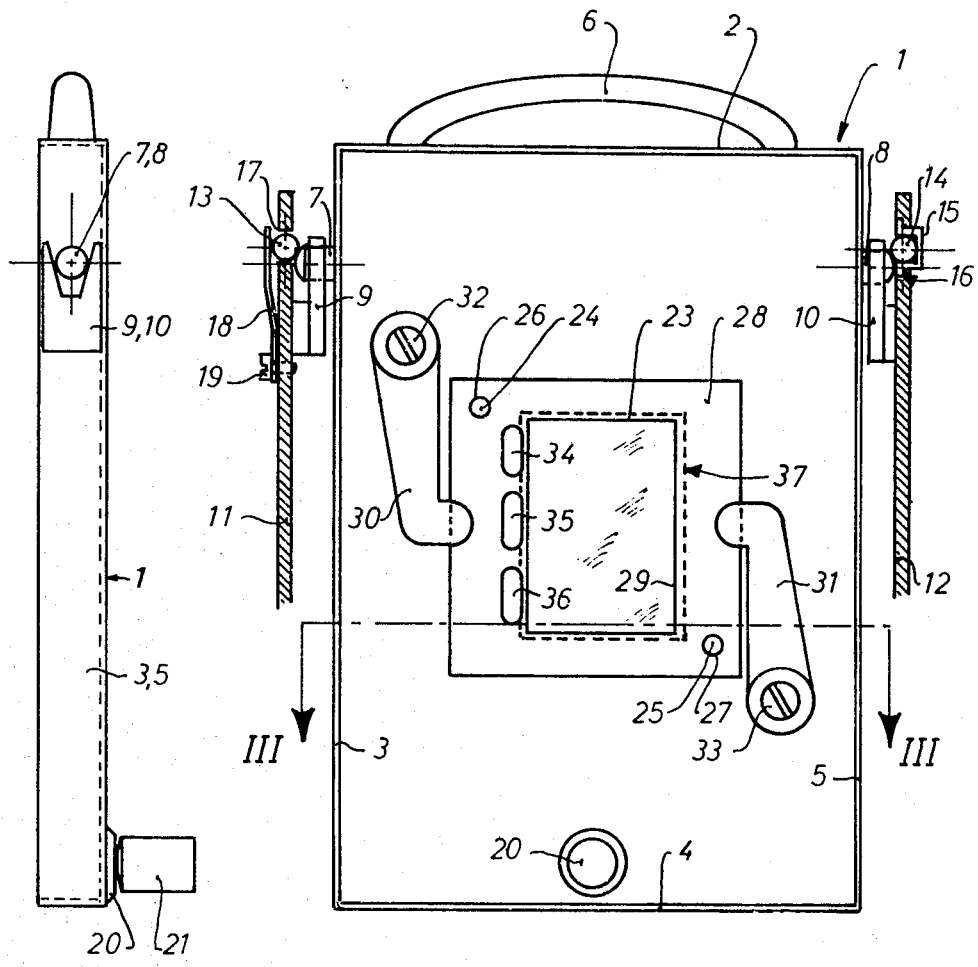
FIG. 1 is a front elevational view of an original mount resting on a basic structure, partially represented, of a more complex optical installation.
FIG. 2 is a side elevational view of the original mount of FIG. 1.

In the drawings, the optical installation wherein the original mount is to be used, is not represented since it is familiar to those skilled in the art, and will further be different according to the different photographic problems and work. However, all parts necessary to perform and understand the invention are represented in the drawings.

Figure 3:
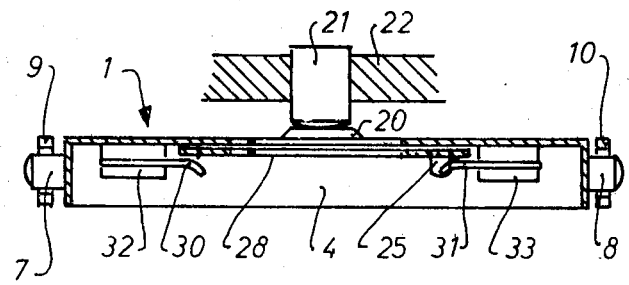
FIG. 3 shows a cross-sectional view of the original mount of FIG. 1, taken along the line III—III of FIG. 1.

The original mount shown in FIGS. 1 to 3 comprises a rectangular frame 1 made by cutting out from a metal sheet and folded or bordered to form four edges 2, 3, 4 and 5 which extend in normal directions to the plane of frame 1. The upper folded edge 2 has affixed thereto a handle 6 serving for transport and handling of the original mount. The folded lateral edges 3 and 5 each bear a positioning pin 7 and 8, respectively, fixed in the upper third of the edges 3 and 5 and extending from both sides of frame 1. Pins 7 and 8 have circular sections and a common axis parallel to the general plane of frame 1. The free ends of both pins are smoothed off. Pins 7 and 8 fit into V-shaped slots of centering bearings 9 and 10, respectively, which are mounted on support brackets 11 and 12, respectively, which are part of a support frame (not shown) of the optical installation (not shown too).

As can be seen in FIG. 1, brackets 11 and 12 each bear a ball 13 and, respectively, 14. These balls 13 and 14 are located in the brackets 11, 12 offset above the common axis of pins 7 and 8 when the frame is in place and the pins are inserted into their respective V-shaped slots. Ball 14 (see FIG. 1) is mounted in rigid abutment against an abutting lid 15 placed in a corresponding bore 16 in bracket 12. Lid 15 entraps and retains ball 14. On the other side, ball 13 is placed in a bore 17 but can travel sidewards against the action of a leaf spring 18 fixed to the interior of bracket 11 by a screw 19.

The frame 1 has at its lower portion a circular protruding plate 20 which abuts against a permanent magnet 21. This magnet 21 is inserted into a support 22 which makes part of the installation support frame mentioned above.

In its central portion, frame 1 is provided with a rectangular window 23 and two centering pins 24 and 25. These pins fit into bores 26 and 27, respectively, of a second frame 28 having also a window 29 the dimensions of which correspond to those of window 23. Second frame 28 is biased against frame 1 by two pivoting spring clips 30 and 31 which are fixed to frame 1 by screws 32 and 33, respectively. The two frames 1 and 28 are furthermore provided with three additional little side windows 34, 35 and 36 which are located at the same places in frames 1 and 28. Gray filters can be introduced into these windows between both frames. These gray filters are well known to those skilled in the art and serve as light adjustments.

The original to be reproduced 37 is clamped between the frames 1 and 28. It should be noted that the generally transparent original is maintained between the frames 1 and 28 without the aid of glass or other transparent plates so that further cleaning is avoided. The central windows 23, 29 of frames 1 and 28, respectively, may have all known and usual dimensions of the originals which are clamped in the original mount. It is preferred to prepare sets of original mounts having windows of different openings, e.g. the following: 24×36 mm; 6×6 cm; 9×12 cm; 9×12 cm; 13×18 cm; and 18×24 cm. In this way, it will be possible to select a particular original mount having a window corresponding to the dimensions of the original to be reproduced.

As has already been mentioned, the original mount of the invention and its support are intended for use in a complex optical installation, e.g. enlarger or optical bench to make separations from transparent originals. The important advantages of the original mount of the invention will further become evident from the following description of its operation.

It will be supposed that a transparent original of, say, 24×36 mm, is placed over the window 23 of frame 1 so that the edges of the original slightly overlap the edges of the window 23 (see reference numeral 37 in FIG. 1). Then, second frame 28 is put upon frame 1 and bores 26 and 27 are placed and slid over their respective centering pins 24 and 25, respectively, and the spring clips 30 and 31 are pivoted inwardly to hold frame 28 exactly as shown in FIG. 1. The original 37 is now clamped between frames 1 and 28. If desired, gray filters can simultaneously be introduced into the little side windows 34, 35, 36.

Now, the complete mount can be seized by the handle 6 and introduced into its support schematically shown by the reference numerals 11, 12 and 22 in the drawing. During this introduction, the operator will first introduce pins 7 and 8 in their respective V slots of bearing parts 9 and 10 before the plate 20 comes in contact with the magnet 21, see FIG. 2. The man skilled in the art will notice that, during the introduction of pins 7 and 8 in the V-shaped slots of the bearing parts 9 and 10, the balls 13 and 14 cause a blocking action in two directions, namely horizontally (in the axis of pins 7 and 8) and vertically. In fact, the biassing force of ball 13, under the action of leaf spring 18, presses frame 1 to the right in FIG. 1, i.e. against ball 14 which serves as an abutment. On the other hand, frame 1 is pressed downwards by the horizontally converging action of the two balls 13 and 14 since they are placed upwardly offset from the common axis of pins 7 and 8. In other words, pin 8 is pushed by ball 13 and its spring 18 against abutting ball 14, and this action results in a precise horizontal positioning, and the two pins 7 and 8 are pushed downwardly by the two balls 13 and 14 which ascertains a precise vertical positioning since pins 7 and 8 are pushed home in the V-shaped slots of bearing parts 9 and 10.

When pins 7 and 8 are thus in their final places, the plate 20 is allowed to come in contact with the magnet 21 so that the original mount is now laterally blocked. When this has been done, one may begin to adjust the enlarger or the optical bench and begin to work on reproductions. The one skilled in the art will immediately understand that, when the optical installation has completely been adjusted and is ready to operate, the original mount can be removed from its support and then replaced thereon without any necessity of a readjustment. On the other hand, a series or set of transparent originals can be mounted on a set of original mounts similar to that shown in the drawing, and these original mounts can successively be inserted and used to produce screened images, separations like color separations, or other photographic products, without intermediate adjustment.

An important advantage of the original mount of the invention resides in the fact that it can be placed, removed and replaced in its support to exactly recover its initial position, i.e. without being subject to displacements during successive positionings. On the other hand, it offers the important advantage to allow serial work when a set of originals to be reproduced is prepared in advance in a set of mounts.

It should furthermore be added that the original mount of the invention permits surprisingly great precision of its positioning relative to its support while only a normal precision is necessary during its fabrication. As has already been mentioned, the outer frame 1 is made from normal metal sheets which are cut and then bordered. The pins 7 and 8 and also the bearing parts (e.g. parts 9 and 10) can be manufactured without particular caution or precision. In spite of these facts, the mount and its support allow a particularly precise positioning of the original to be reproduced.

A further advantage of the original mount of the invention is that the transparent original is clamped directly between the two frames 1 and 28 without further surface supports, especially glass plates, and in this way image distortions and defects are avoided which normally frequently occur due to specks and dust on these glass plates which is nearly impossible to avoid. The invention therefore permits to obtain a better and more regular quality of the reproductions.

Having now described the invention, those skilled in the art will be able to make various changes and modifications without thereby departing from the scope and spirit of the invention as recited in the following claims.

What is claimed is:

1. A mounting device for originals to be reproduced in photographic equipment, comprising:
a first and a second frame; said frames being superimposed; each said frame having an exposure window, and said exposure windows being superimposed when said frames are superimposed; said superimposed frames being adapted to clamp between them the edge portions of an original to be exposed in said exposure windows;

a support for said frame;

fixing means for holding said frames to said support;

said first frame having opposite lateral sides; said fixing means comprising said first frame having a respective pin at each lateral side; each said pin having at least a segment thereof of circular cross-section;

said fixing means further comprising, on said support, a respective bearing part being provided for each said pin; each said bearing part including a generally V-shaped slot in said support, and each said pin segment being received in a respective said generally V-shaped slot therefor;

said fixing means further comprising spring means connected with said pins for firstly biasing said pins into the narrower ends of said generally V-shaped slots therefor and for secondly biasing said pins in a direction parallel to the axes of said pins;

an abutment on one said bearing part for opposing the second bias of said pins by said spring means, thereby for positioning said pins in a direction parallel to the axes of said pins.

2. The mounting device of claim 1 wherein one of said frames is provided with two positioning pins arranged to enter corresponding bores in the other said frame and the other said frame has the corresponding bores therein.

3. The mounting device of claim 1 wherein second spring means are provided for pressing said two superimposed frames against each other.

4. The mounting device of claim 1, further comprising a magnet mounted in said support as a lateral abutment part for exerting magnetic force on said frames normally to the general plane of one of said frames.

5. The mounting device of claim 1, further comprising additional little windows provided in the proximity of the edges of said exposure window.

6. The mounting device of claim 1 wherein said frames are made of metal sheet.

7. The mounting device of claim 1, wherein said pins each have a respective free end; each said pin free end having a surface thereof which is inclined for facing both upwardly out of said generally V-shaped slot therefor and outwardly away from said first frame;

said spring means comprising a respective ball carried by said support and located above the axis of the respective said pin and engaging said inclined surface of the respective said pin; said spring means further comprising a spring biasing one said ball toward the respective said pin free end; said abutment engaging the other said ball for opposing the action of said spring.

8. The mounting device of claim 7, wherein each said pin free end is rounded off convexly.

9. The mounting device of either of claims 7 or 8, wherein said pin is of circular cross-section.

10. The mounting device of either of claims 7 or 8, wherein said pins have a common axis.

11. The mounting device of claim 7, wherein said spring is a leaf spring, which is normally biased inwardly toward said frame.

* * * * *